United States Patent [19]

Berg, Jr.

[11] 3,995,734
[45] Dec. 7, 1976

[54] MANURE TRANSFER APPARATUS

[76] Inventor: Vernon R. Berg, Jr., 413 W. Park St., Marshfield, Wis. 54449

[22] Filed: Feb. 13, 1975

[21] Appl. No.: 549,633

[52] U.S. Cl. .............................. 198/540; 100/179; 417/503; 417/553; 198/747
[51] Int. Cl.² ...................................... B65G 25/08
[58] Field of Search ................. 198/226, DIG. 18; 214/16 R; 100/179, 245; 417/503, 552, 553

[56] References Cited
UNITED STATES PATENTS

| | | | |
|---|---|---|---|
| 2,238,944 | 4/1941 | Muller et al. | 198/226 |
| 3,103,276 | 9/1963 | Schmitzer | 198/226 |
| 3,485,481 | 12/1969 | Zimmerman | 198/226 |
| 3,621,775 | 11/1971 | Dedio et al. | 100/179 |
| 3,687,311 | 8/1972 | Nesseth | 214/16 R |
| 3,872,981 | 3/1975 | Hedlund | 198/226 |

*Primary Examiner*—Evon C. Blunk
*Assistant Examiner*—Jeffrey V. Nase
*Attorney, Agent, or Firm*—Wheeler, Morsell, House & Fuller

[57] ABSTRACT

A pumping system for conveying animal waste from a livestock housing to a remote storage area includes a hopper which is conveniently located in a pit adjacent to a chain driven barn cleaner or the like, a vertically oriented upwardly open pumping chamber in communication with the hopper and a hydraulically operated ram which travels vertically through the hopper into the pumping chamber to force the waste through a reducer and discharge pipe to a storage pit or area located remote from the livestock housing. Other features include a vacuum relief valve located in the pumping chamber or ram to release the vacuum on the return stroke of the ram and thus, reduce the power required to move the ram to its retracted position. The vacuum relief valve also eliminates the need in some installations for a check valve to prevent reverse flow of manure into the hopper from the storage pit.

7 Claims, 20 Drawing Figures

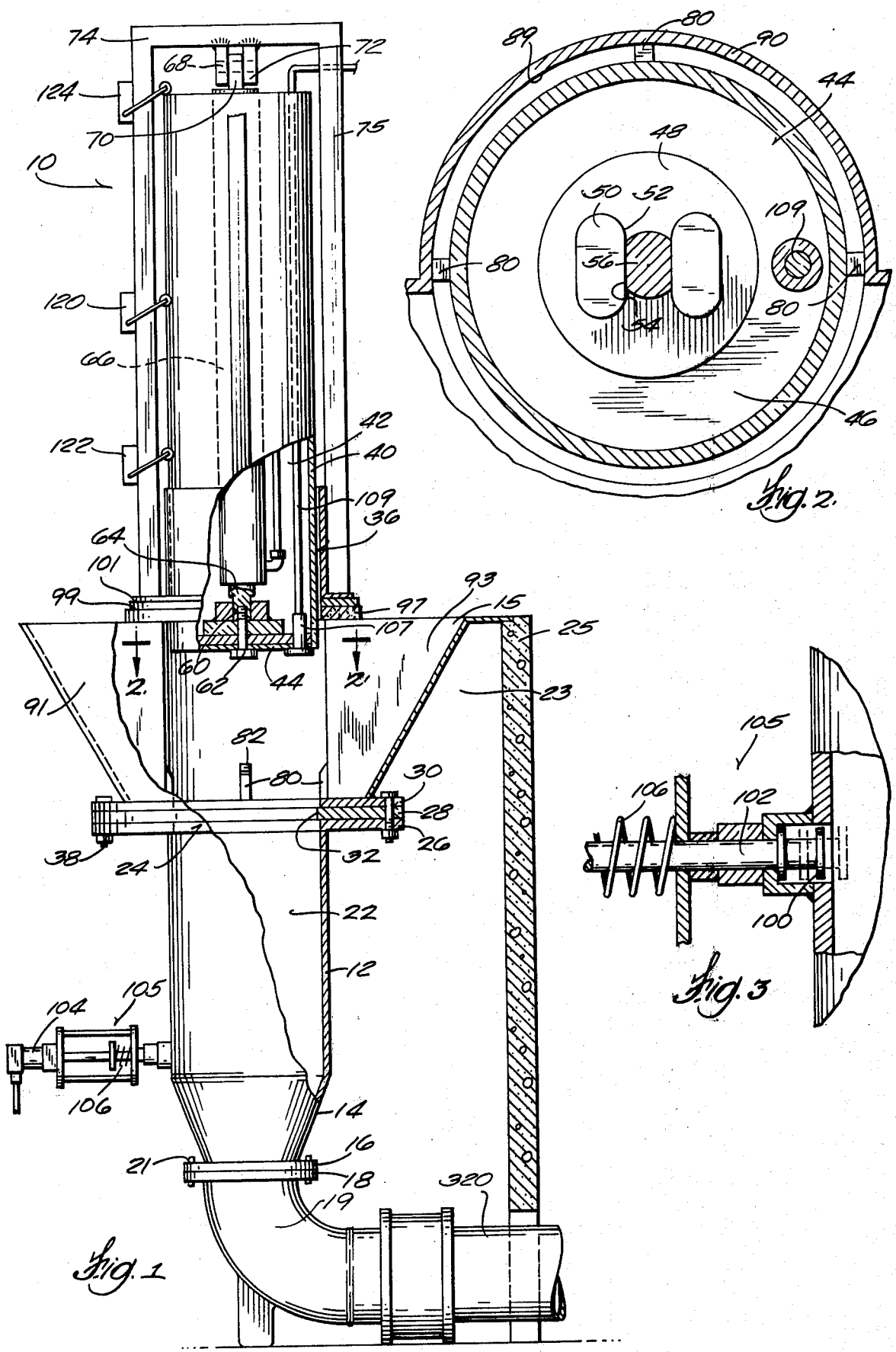

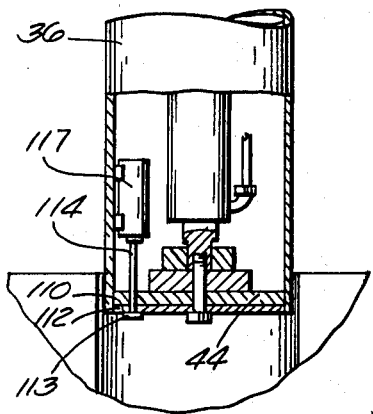
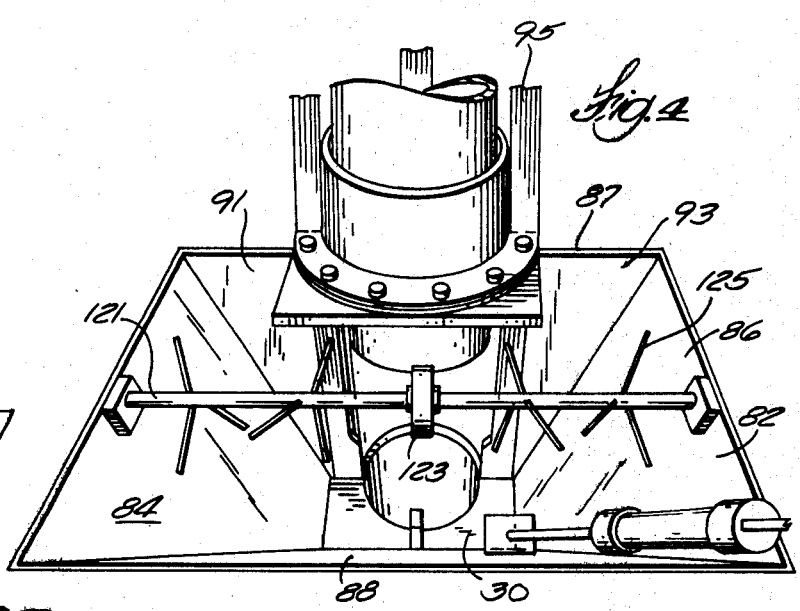
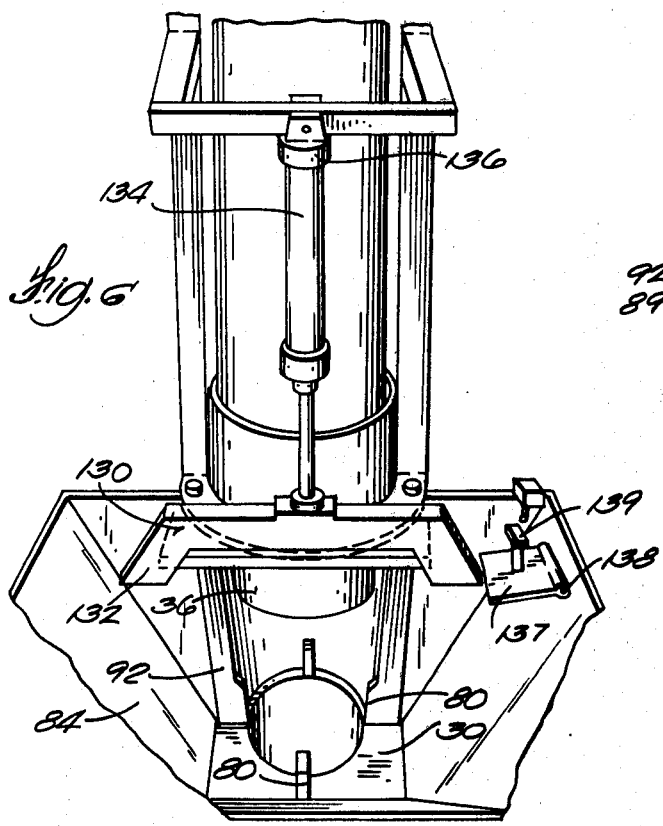
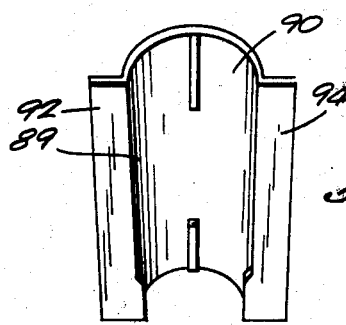
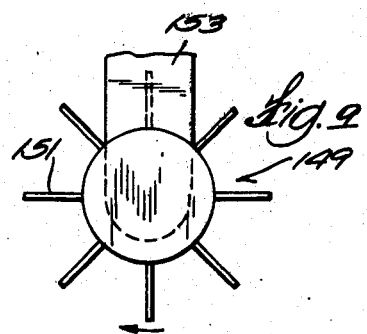
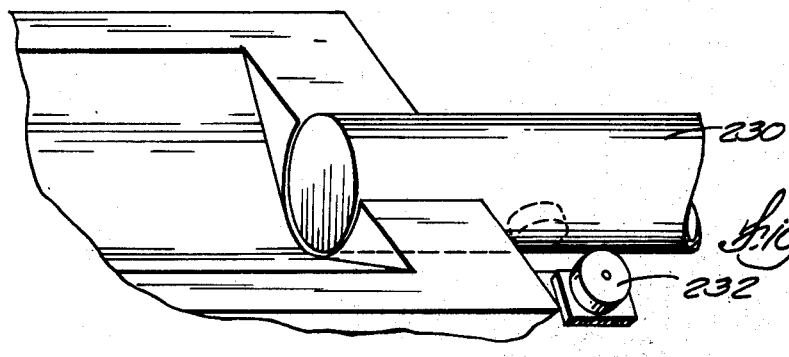

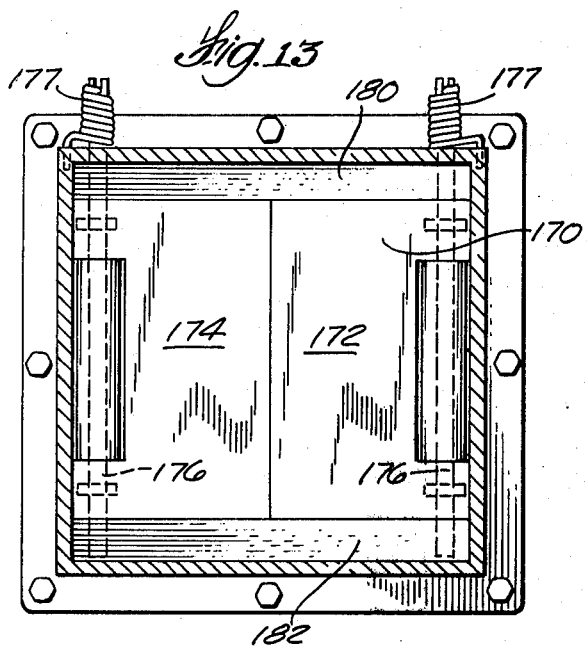
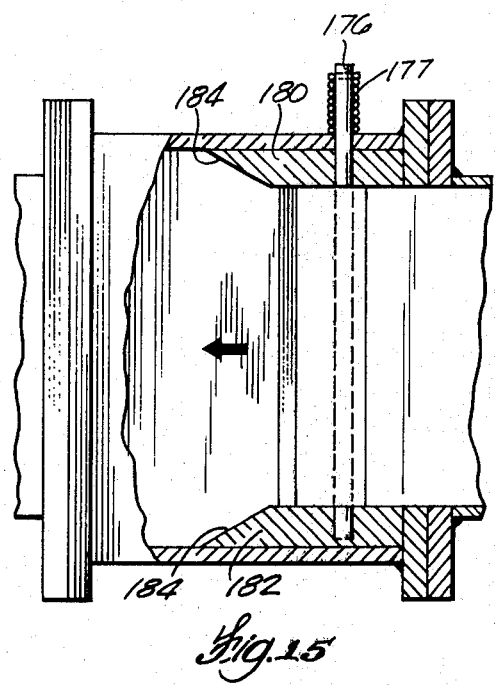
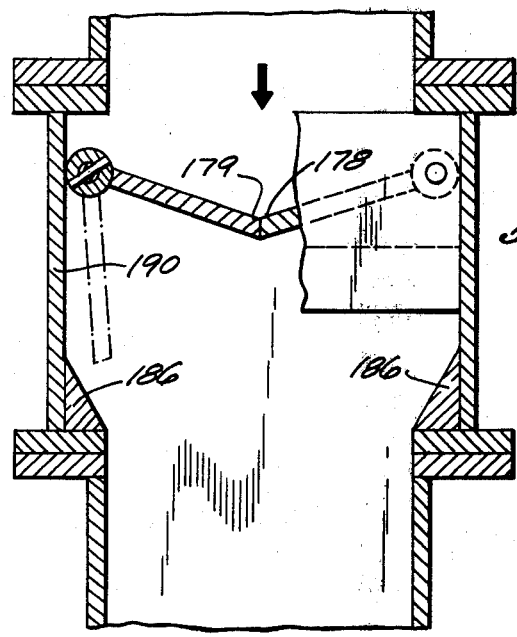
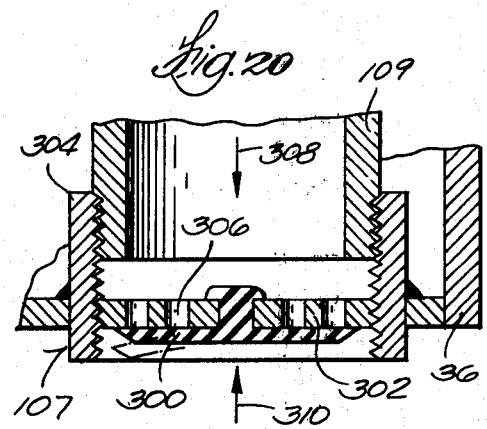
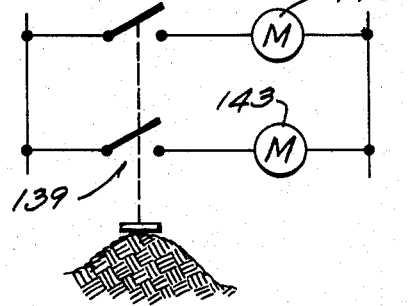

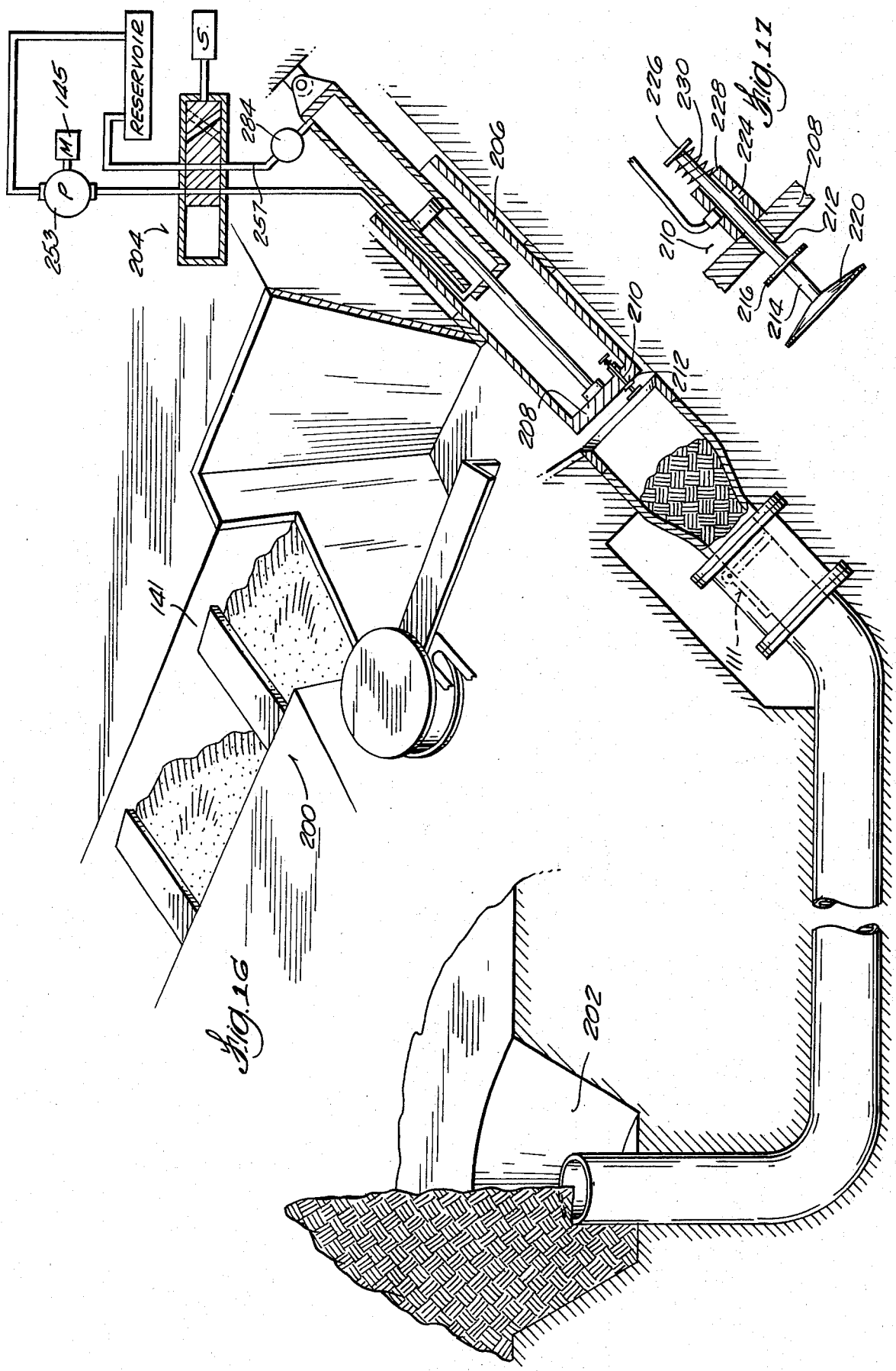

MANURE TRANSFER APPARATUS

BACKGROUND OF INVENTION

The invention relates to improvements in apparatus for pumping manure with a ram and pumping chamber to a remote storage pit. With the increase in barn size and dairy herds, an interest has developed for conveying the large volumes of solid and liquid wastes to a remote site where the manure can be used when desired. U.S. Pat. Nos. 3,687,311 and 3,103,276 are examples of pumping apparatus to accomplish this objective. The present invention provides a pump construction and apparatus to overcome some of the deficiencies of the systems shown in the foregoing patents.

Summary of Invention

The invention provides a pumping system which includes numerous features intended to make such a pump practical for efficient handling of large volumes of animal waste. In the preferred embodiment, the ram is in the form of a hollow cylinder, closed by a ram head at one end and open at the other end with the ram supported for vertical reciprocal movement through a hopper and into a pumping chamber at the bottom of the hopper. The ram is supported only by a hydraulic cylinder which is connected to a frame cross member located above the ram. The hydraulic cylinder has a piston rod fixed to the ram head and the body of the cylinder is located within the ram to minimize the height of the pumping apparatus and thus, afford installation in old barns which generally have a low ceiling. The cylinder or ram is free to migrate with the normal rotation of the piston rod of the hydraulic cylinder to make the wear on ram surfaces uniform. Replaceable wear rings for the ram facilitate maintainence of the unit.

The pumping system also includes a mechanical agitator to prevent clogging of the hopper with bedding straw or other debris which can be operated hydraulically or by driving engagement with the ram.

A vacuum relief valve located in the pumping chamber or ram head permits entry of air into the pumping chamber beneath the piston during the upstroke of the ram to release the vacuum and minimize the suction drag on the ram. The vacuum relief valve eliminates in some installations, the need for a check valve to prevent backflow of manure into the hopper and substantially reduces the horsepower requirements for the electric motor which operates the hydraulic pump in all installations.

The invention provides hydraulically operated check valves for use where the remote manure accumulation is above the level of the hopper. The check valves in one embodiment have a hydraulic cylinder connected to the hydraulic circuit for the ram with the check valve cylinder operating to open the check valve during the working stroke of the ram and close the check valve during retraction of the ram.

Other features of the invention include a hopper construction in which the pumping chamber is offset from the center of the hopper bottom and a portion of a hopper wall is defined by a semi-cylindrical vertical wall portion which is concentric and spaced from the ram to seal the hopper around the offset pumping chamber inlet. The semi-cylindrical wall portion also concentrically locates and radially spaces ram guides fastened to the inner surface of the wall portion which are located in advance of the pumping chamber inlet. Such construction with the use of a vertical ram eliminates the need for liquid seals required for the piston in a horizontal orientation as found in U.S. Pat. No. 3,103,276. The semi-cylindrical wall portion has vertical flanges connected to vertical hopper wall portions which provide smooth flow of material into the pumping chamber.

The pumping system of the invention also includes a level sensor which operates a limit switch to prevent overflow of the hopper by de-energizing the motor of the barn cleaner conveyor.

Further objects, advantages and features of the invention will become apparent from the following disclosure.

DESCRIPTION OF DRAWINGS

FIG. 1 is a side elevational view in fragmentary section of a pumping apparatus in accordance with the invention located in a concrete pit.

FIG. 2 is an enlarged sectional view along the line 2—2 of FIG. 1.

FIG. 3 is an enlarged sectional view of the vacuum relief valve shown in FIG. 1.

FIG. 4 is a fragmentary perspective view of the hopper and ram assembly shown in FIG. 1 and including hopper agitators.

FIG. 5 is a perspective view of the semi-cylindrical hopper wall shown in FIG. 4.

FIG. 6 is a fragmentary perspective view similar to FIG. 4 of a modified embodiment showing a hopper agitator and level sensor.

FIG. 7 is a fragmentary sectional view of a ram including a vacuum relief valve.

FIG. 8 is a fragmentary view of a roller support for a horizontally oriented ram.

FIG. 9 is a plan view of a rotary hopper agitator.

FIG. 13 is an end view of a spring biased check valve.

FIG. 14 is a plan view in fragmentary section of the check valve assembly shown in FIG. 13.

FIG. 15 is a side view of the check valve assembly shown in FIG. 13.

FIG. 16 is a schematic diagram of a hydraulic circuit and perspective view of a hopper, inclined ram and discharge pipe.

FIG. 17 is an enlarged view of the vacuum relief valve shown in FIG. 16.

FIG. 18 is a schematic diagram of a hopper level sensor circuit.

FIG. 20 is a sectional view of a vacuum relief valve in the ram head.

DESCRIPTION OF PREFERRED EMBODIMENT

Figure 10:
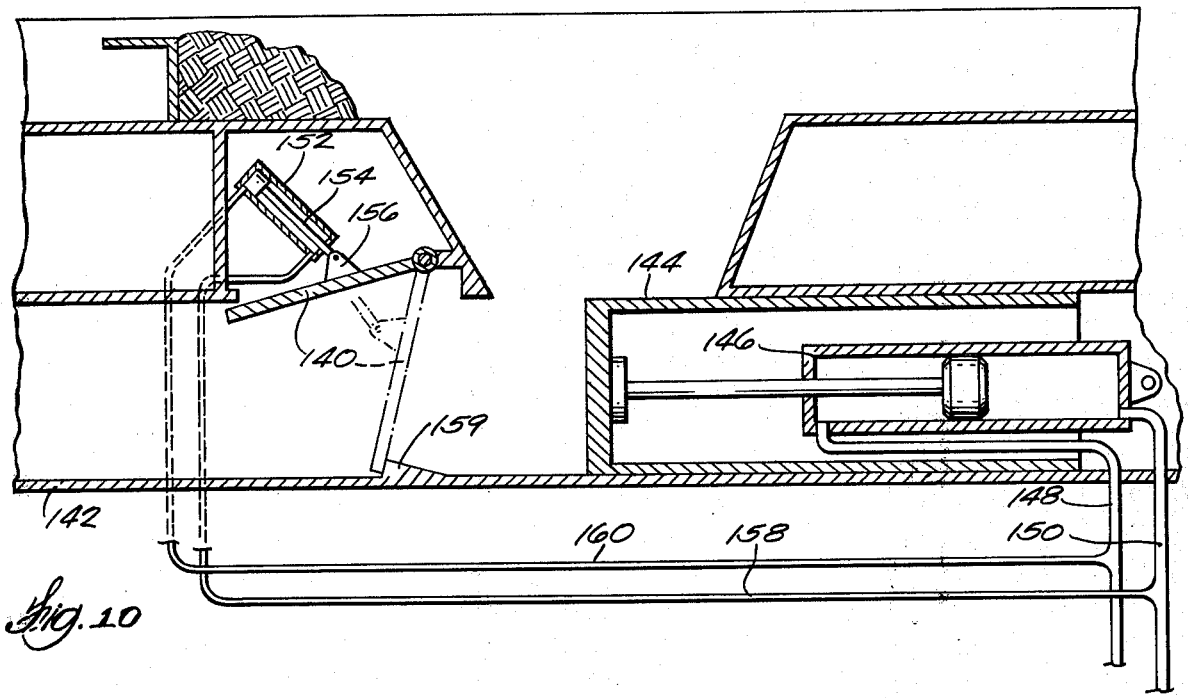
FIG. 10 is a schematic side elevational view in section of a horizontally oriented ram with a hydraulically actuated check valve.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, a hydraulic pump 10 is disclosed which includes a pumping chamber 12 having a reducing section 14 provided with a flange 16 connectable to a flange 18 on an elbow 19. The flanges 16, 18 are provided with a plurality of circumferentially arranged registrable apertures and bolts 21 which enable the elbow 19 to be rotated into a plurality of positions. Thus, the hopper 15 can be positioned in the most convenient position for the livestock facility which contains the pumping system. The pumping system will normally be located in a pit 23 with concrete walls 25.

The pumping chamber 12 has an interior 22 with an upwardly open inlet 24 defined by apertures in a flange 26, a wear ring 28 and a hopper bottom plate 30. The wear ring aperture 32 has a diameter slightly less than the apertures in members 30 and 26, to provide a bearing surface for the ram 36 which is presently described in detail. The wear ring 28 is bolted between the flanges 30 and 26 by bolts 38, and thus can easily be replaced when required.

The ram 36 is defined by a cylindrical wall 40 which surrounds a ram cavity 42. The ram head 44 (FIG. 1, 2) includes a plate 46 and a smaller diameter concentric plate 48 which is welded to plate 46 and a pair of spaced members 50 having opposed flats 52 which engage flats 54 on the hydraulic cylinder piston rod 56. The piston rod (FIG. 1) has an internally threaded aperture 60 for receiving a bolt 62 which extends through an aperture in the plate 46 and into aperture 60. The use of the bolt 62 and internal threads on the piston 64 insures easy separation of the parts which readily corrode in this environment.

The hydraulic cylinder 66 is pivotally supported by a pin 68 (FIG. 1) which extends through the cylinder connection tab 70 and two spaced ears 72 which are connected to an upstanding frame 74 which includes three or more vertical frame members 75. Inasmuch as the piston rod 64 migrates or rotates during use the ram 36 will also rotate and provide uniform wearing of the peripheral ram surface.

As best shown in FIGS 5 and 6, the ram 36 is guided into the pumping chamber inlet 24 by four spaced guide ribs 80 provided with beveled leading edges 82. Three of the guide ribs 80 are located on the inner surface 89 of a semi-cylindrical wall portion 90 (FIG. 5) which is concentric with the ram and spaced from the ram. The wall portion 90 thus, facilitates radial and circumferential positioning of three of the guide ribs 80. The fourth guide rib 80 is located on a hopper wall 88. A tapered wing (not shown) above this guide rib 80 prevents straw hangup on the rib 80.

A replaceable wear ring or seal 99 (FIG. 1) can be bolted between plate 97 and ring flange 101 to seal against leakage from the hopper when the ram is inclined rather than vertical. The ring 99 can also provide an additional bearing surface.

To facilitate installation of the hydraulic pumping system in various barns and concrete pits, the hopper walls 84, 86 and 88 can be varied in size and shape. The rear hopper wall 87 is formed by the semi-cylindrical wall portion 90 which has out-turned flanges 92, 94 which are welded to the wall portions or wing portions 91, 93. The top of semi-cylindrical wall portion 90 is secured to the plate 97 of the ram supporting frame 74 and at the bottom to the plate 30.

As shown in FIGS. 4 and 5, the pumping chamber inlet is offset from the center of the bottom wall 30 and thus, closer to the vertical walls 91, 93, 90. Such construction provides good gravity feed to the inlet 24.

The use of a vertical ram and guide as described eliminates the sealing and bearing problems, associated with a horizontal ram which must be sealed to prevent leakage of manure between the hopper and ram into the concrete pit. The vertical ram also minimizes the size of the pit required and enables use of a longer ram stroke.

In accordance with the invention, vacuum relief means are provided to permit entry of air into the pumping chamber 12 during withdrawal of the hydraulic ram 36 to minimize the suction on the ram, and thus reduce the horsepower required for the motor which drives the hydraulic pump which powers the hydraulic cylinder 66. In FIGS. 1 and 3, a valve 105 has valve member or plate 100 at the end of a valve stem 102 and is movable between the solid line closed valve position shown in FIG. 3 to the dotted line position in FIG. 3 permitting entry of air into the working chamber 12 downstream of the ram 36. The stem 102 is shifted by a hydraulic cylinder 104. A spring 106 biases the valve to the closed solid line position in FIG. 3. The valve 105 can be operated in synchronism with the reciprocation of the ram by a vertically adjustable limit switch 120 (FIG. 1) which actuates a solenoid to open a hydraulic valve (not shown) to supply pressure to hydraulic cylinder 104 and open valve 105 as the ram retracts.

In FIG. 7 a vacuum relief valve 110 is shown in the ram head 44. An aperture 112 in the ram head is opened by extending the rod 114 when ram 36 is withdrawn from the pumping chamber. The hydraulic cylinder can be operated by the limit switch 120 as described for valve 105. In FIG. 1 a second vacuum relief valve 107 in the form of a check valve is mounted in the ram head. The check valve prevents flow of manure into the ram and the membrane check member opens by suction to release air into the pumping chamber upon withdrawal of the ram. The check valve 107 can be connected to a pipe 109 to receive any liquids which get through the valve. A bayonet connection in the ram head facilitates removal of the valve by manipulation of the pipe.

To prevent blockage of the hopper 15 caused by straw bridges between the opposed walls of the hopper, the invention provides an agitator 130 (FIG. 6) which includes a working tool 132 which can be operated by a hydraulic cylinder 134 suspended from the frame at 136. Working tools of various configurations can be employed depending on the shape of the hopper 15. The agitator 130 can reciprocate at a faster cycle than the ram cycle or a slower cycle than the ram depending on the circumstances and the nature of the animal waste being pumped. In free stall barns bedding straw is not employed and thus, clogging of the hopper with bedding straw does not occur. A modified form of agitator is shown in FIG. 9 with a rotary hydraulic motor 149 having a paddle wheel 151 which is supported from a bracket 153.

FIG. 4 shows a hydraulic cylinder agitator 130 located in the corner of the hopper. FIG. 4 shows a hydraulic cylinder agitator 130 located in the corner of the hopper. FIG. 4 also shows a further modification of an agitator in which a shaft 121 with tines 125 is rotatably supported on the hopper. A wheel 123 fixed to the shaft 121 is engaged by the ram 36 on the up and down stroke to rotate the rod and tines 125.

FIG. 6 shows a level sensor with a sensing plate 137 pivotally mounted on a bracket 138 fastened to the hopper. A limit switch 139 is actuated by the sensing plate to control flow of manure into the hopper. For instance, where the manure is swept into the hopper by a conventional barn cleaner employing a plurality of flights 141 (FIG. 16) connected to an endless chain which makes a circuit through the barn floor gutter and deposits the manure in the hopper at one point in the circuit, the limit switch 139 can be connected in the circuit of the barn cleaner motor 143 as shown in FIG. 18.

When the manure accumulates in the hopper to a pre-selected level, the limit switch 139 will de-energize the barn cleaner motor and stop the flow of manure into the hopper and prevent overflow of the hopper. The limit switch can also be employed to de-energize the motor 145 for the hydraulic pump shown in FIG. 16. Thus, if there is any blockage in the discharge pipe or hopper the system will be shut down as the hopper contents reach the selected height. The switch can also be employed to actuate an alarm signal or energize the motor 145 to prevent backflow through the discharge pipe from filling the hopper and spilling into the pit.

Although as noted above, a vacuum relief valve can eliminate the need in some installations for a check valve on the discharge side of the pumping chamber, FIGS. 10 to 14 show check valves which can be employed if required to prevent backflow of manure into the hopper from the storage pit. FIG. 10 shows a pivotally supported valve member 140 in a discharge pipe 142 with a horizontally oriented ram 144. The hydraulic cylinder 146 is located inside the ram and is provided with fluid conduits 148, 150 for driving the ram in opposed directions. The check valve member 140 is moved from the solid to the dotted line position by a hydraulic cylinder 152. The piston rod 154 of cylinder 152 is pivotally connected to an ear 156 on the valve member 140. The hydraulic cylinder 152 is connected to fluid conduits 148, 150 by lines 158, 160. During the pumping stroke of the ram, as it travels toward the discharge pipe, fluid pressure in the line 158 will cause movement of valve plate 140 to the open solid line position in FIG. 10. As the hydraulic ram commences return to the retracted position, fluid pressure in line 160 will cause valve member 140 to move to the dotted line closed position against a stop 159.

Figure 11:
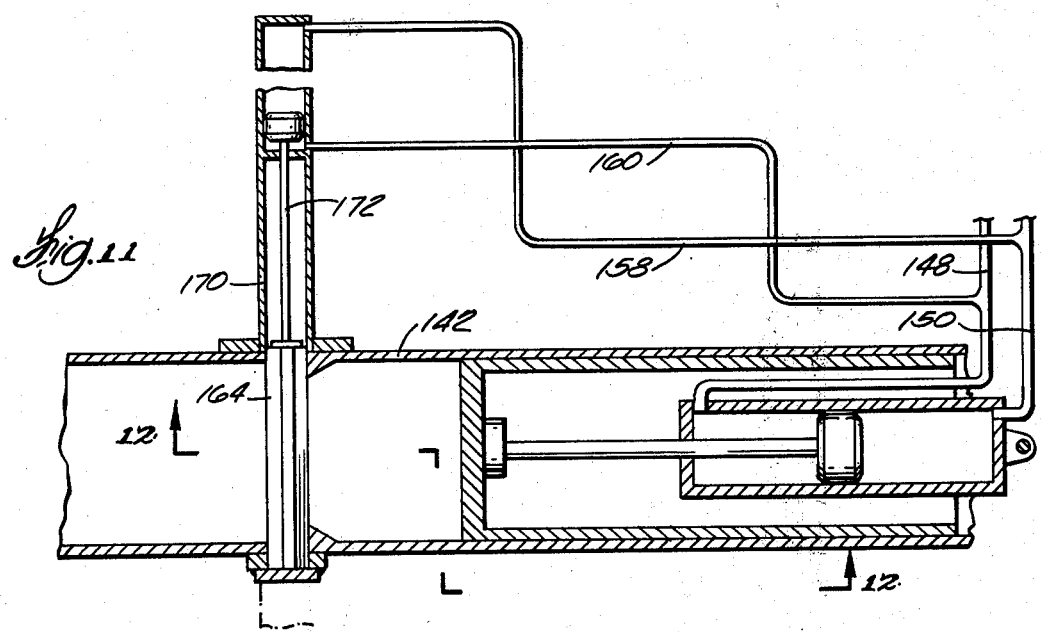
FIG. 11 is a plan view in section of a modified embodiment of a check valve assembly.
Figure 12:
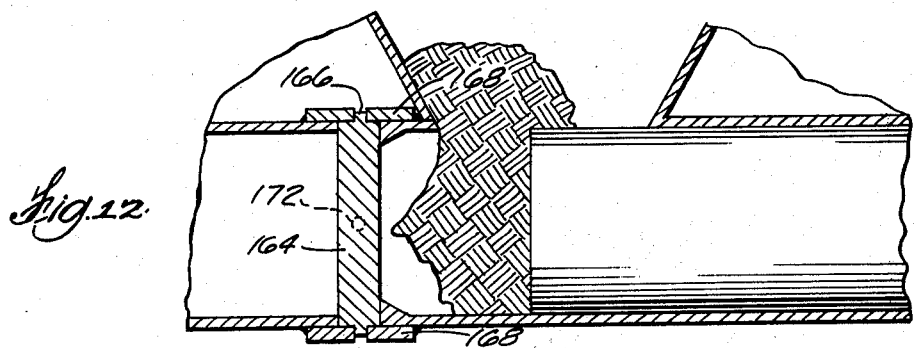
FIG. 12 is a side view in fragmentary section of the apparatus shown in FIG. 11.

FIGS. 11 and 12 show a modified embodiment of a check valve in which the valve member 164 travels in a plane perpendicular to the discharge pipe 142. The tenons 166 on each side of the valve member 164 are guided and sealed in guide tracks 168. A hydraulic cylinder 170 has a piston rod 172 connected to the valve member 164 to move the valve member to the open or closed positions. Fluid lines 158, 160 connect the power cylinder 170 to the fluid lines 148 and 150 to afford retraction of the valve member 164 during the pumping stroke of the ram, and advance of the valve member to the closed position as the ram is retracted.

FIG. 13 shows a check valve assembly 170 which includes two check valve plates 172, 174. Each plate is rotatably supported by a shaft 176 connected to the plate. The plates 172, 174 are biased by torsion springs 177 to a closed position shown in FIG. 14 with the ends 179, 178 of the plates engaging at a point downstream of a transverse line connecting the axes of rotation. The ends 179, 178 thus provide a seal. The zones above and below the plates are sealed by upper and lower filler strips 180, 182 which can be provided with beveled lead in surfaces 184 to guide the plates 172, 174 to the closed position.

As shown in FIG. 14, abutments 186 can be provided to prevent angular movement of the plates to a position parallel with the walls or a position more than 90° from the center line between the pivots which could prevent return of plates to the closed position.

FIG. 16 discloses a hydraulic manure pump inclined at an angle with respect to the floor 200 of the barn. In some installations an angle is preferred because of vertical height limitations, and reduced opportunity for bridging. FIG. 16 also shows a remote pit 202 and a hydraulic pump and valve assembly 204 for operating the ram 206. The end wall 208 of the ram includes a mechanical vacuum release valve 210 with an air hole or aperture 212 which is open and closed by a valve member which includes a valve stem 214 which is movable through the aperture 212 in the end wall 208. The valve stem is provided with a valve member 216 which seals the opening 212 when the ram is in pumping motion toward the pumping chamber and discharge pipe. When the ram is retracted from the pumping chamber drag of the manure on the plate 220 causes the valve member to be displaced to the open position thus, to permit air flow through openings 224 and aperture 212 to the area beneath the ram to release the vacuum. The valve stem can be provided with a stop member 226 which engages the end of the boss 228 to limit displacement of the valve stem upon withdrawal of the ram. A spring 230 can also be employed to return the valve plate 216 to the sealing position for the downstroke of the ram and when the ram is not in use.

FIG. 17 also shows a water hose connected to the valve assembly shown in FIG. 16. The valve member with modifications can thus, control introduction of water under pressure to relieve the vacuum. Alternatively, the hydraulically operated valve 110 in FIG. 7 can control the water flow. The use of water will prevent sticking or jamming of the valve and also provide lubrication for the ram in the pumping chamber. Moreover, the addition of water will minimize friction in the discharge pipe and facilitate material flow. If a horizontal ram is required, such as that shown in FIG. 8, the ram 230 can be supported by one or more sets of rollers 232 with the roller axes parallel to a plane tangent to the surface of the ram at the point of contact of the rollers with the ram. The roller support reduces friction and wear on the ram to prolong the life thereof.

As shown in FIG. 1, in addition to limit switch 120, limit switches 122 and 124 (FIG. 1) are provided to control ram movement. The switches 122 and 124 are actuated by engagement with the peripheral surface of the ram. The limit switch 122 limits the lower movement of the ram into the pumping chamber 12 and the limit switch 124 limits the upper movement of the ram.

Figure 19:
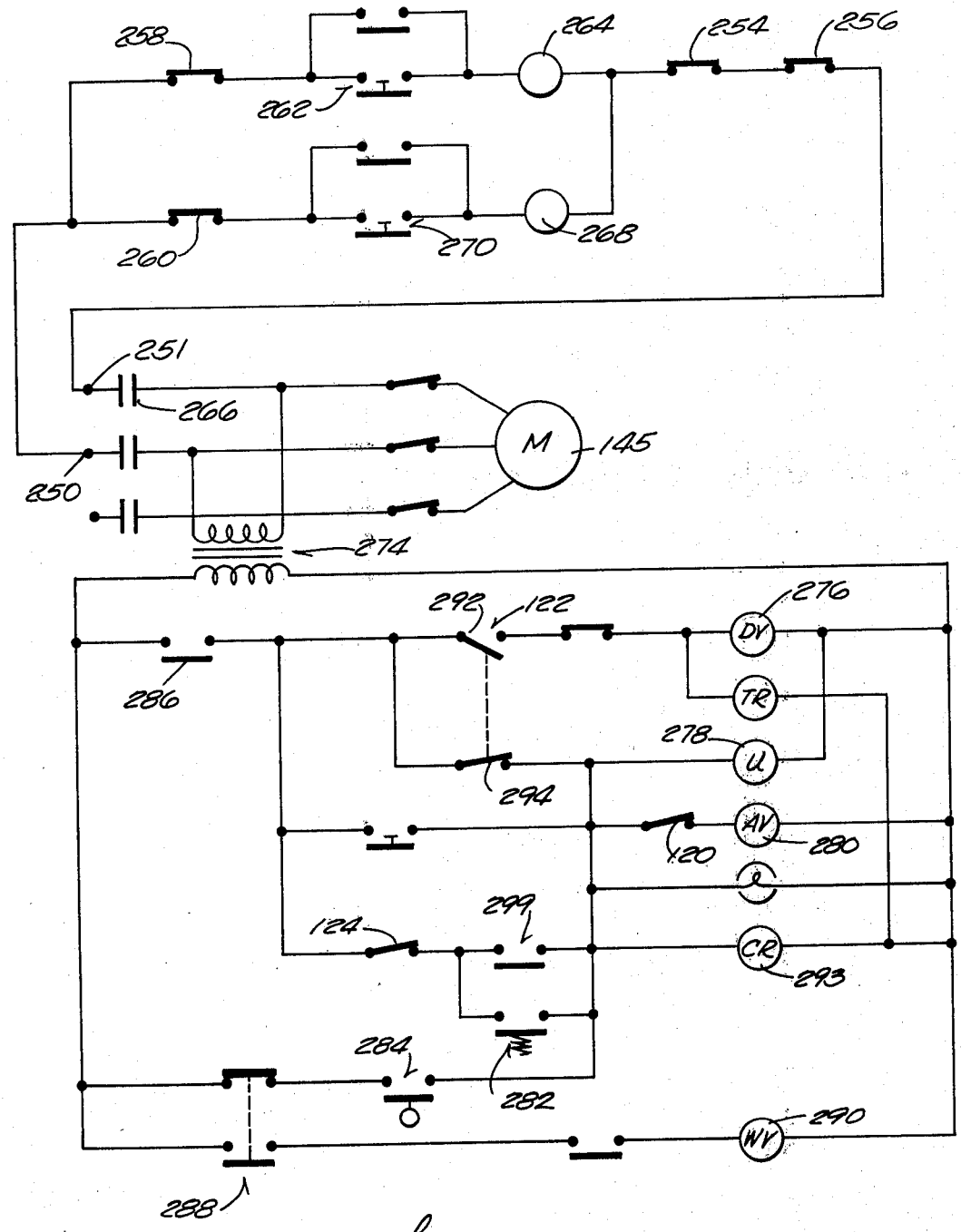
FIG. 19 is a schematic diagram of an electrical control circuit for the pumping apparatus.

FIG. 19 shows an electrical circuit for operating the pump motor 145 and performing other control functions for the manure pump. The switch 254 is an overload switch in the motor control for the hydraulic pump 253 (FIG. 16) which is in series with the switch 256 which is the overload switch in the motor control for the barn cleaner motor 143. Thus, upon occurrence of an overload for either the barn cleaner motor 143 (FIG. 18) or the pump motor 145 the circuit is interupted to de-energize both controls for motors 143 and 145 and stop both the barn cleaner and the manure pump.

The switches 258, 260 are stop buttons and the switch 262 is a start button. The coil 264 operates contacts 266 for starting and stopping the motor 145.

The coil 268 is the contactor coil for the barn cleaner motor, the contacts of which are not shown. Switch 270 can be a start switch or a limit switch such as the limit switch 139 for sensing the level of the hopper contents.

The transformer 274 provides 110 volts for the control circuit for the solenoid valve 204 shown in FIG. 16. Limit switches 122, 124 and 120 shown in FIG. 1 respectively control energization and de-energization of coils 276, 278 and 280. The coils 276 and 278 operate the solenoid valve 204. The coil 280 operates the hydraulic cylinder 104 which in turn operates the vacuum release valve shown in FIG. 3.

The circuit can also optionally include a timer switch 282 and a pressure switch 284 for purposes presently described. The switch 286 is a selector switch for manual or automatic control of the ram and the switch 288 is a manual control for the water valve coil 290.

In operation of the circuit, when switch 286 is closed current is available to operate the down ram and up ram circuits in automatic sequence. When the ram reaches the bottom of its stroke contact 292 is opened as shown. The coil 278 will then be energized to actuate the solenoid valve 204 and raise the ram. When the ram reaches the top of its stroke the limit switch 124 is engaged and the contacts opened. The ram then ceases upward movement and the down ram cycle commences.

The pressure switch 284 is located in the hydraulic circuit conduit 257 (FIG. 16) and can be employed to actuate the ram-up circuitry to cause reversal of the ram and free the ram from obstructions such as wood chips which can cause binding of the ram at the sealing rings. For instance, if ram movement is stopped by an obstruction prior to completing its travel during the working stroke, the increase in pressure is sensed by switch 284 which will provide a pulse to stop downward ram movement and initiate the up cycle.

The timer 282 can also be employed to cause a reversal of the ram. If the down cycle of the ram exceeds the pre-selected setting of the timer because of a heavy load or blockage of the discharge pipe, a pulse to coil 278 will raise the ram.

The coil 290 can be used to actuate a solenoid operated water valve which can introduce water beneath the ram through any of the air valves shown, to flush the valve, reduce vacuum and lubricate the ram and discharge pipe. The water valve coil 290 is controlled by the switch 288. A coil 293 is employed in connection with contacts 299 to provide a holding circuit on the up stroke. The air valve coil 280 also operates only on the up stroke because it is in the ram-up circuit.

The use of a vertical ram as disclosed herein enables use of a larger diameter and heavier ram than is practical for a horizontal installation. A ram having a diameter of 14 inches can be employed as compared with 10 inches which is a practical size for a horizontal ram. The larger ram provides greatly increased pumping capacity. The gravity weight of the ram in a vertical or inclined installation assists in forcing the animal waste out the discharge pipe and minimizes the horsepower required for the hydraulic pump as compared to horizontal rams. For instance, a 7½ hp electric motor has given good results in a vertical installation whereas 10 hp to 15 hp is required in horizontal installations with a smaller diameter ram. Accordingly, there is a substantial savings in energy with a vertical ram. Moreover, the use of the vertical or inclined ram minimizes the sealing problems which are required with a horizontal ram.

With a horizontal ram fluid can seep from the storage pit through the discharge pipe 320 and into the concrete pit in which the pump is located if adequate seals are not provided. In addition, use of the vertical ram results in positioning of the limit switches and other electrical circuitry above the pit to minimize the hazards associated with switches located in a pit with a horizontal ram as a result of immersion.

The use of a vacuum relief valve enables withdrawal of the larger diameter ram which may be employed in the vertical construction shown herein. Without a vacuum relief valve a vertical ram of large diameter would not be practical. Although a vertical ram is principally discussed herein, rams inclined from vertical to 30° from vertical also obtain various of the advantages and benefits of the invention.

The drawings show one check valve located adjacent the pumping chamber, however, two check valves are desirably employed if the storage area is above the hopper. One check valve or a manually operated valve can be located adjacent the storage pit to prevent return flow into the discharge pipe when servicing the check valve adjacent the pumping chamber.

The disclosure of various mechanical and hydraulic vacuum relief valves is for illustration only and other valves which release the vacuum beneath the ram are within the purview of the invention. FIG. 20 shows the details of a valve 107 in which a flexible membrane 300 is connected to a valve seat 302 which spans the inside diameter of the valve housing 304. The valve seat 302 has a plurality of through apertures 306. Downward movement of the ram against the manure in the direction of arrow 308 will press the manure against the membrane 300 to seal the apertures and prevent entry of manure into the valve. Upon retraction of the ram in the direction of arrow 310 the suction on the ram head and the membrane 300 will displace the membrane 300 from the valve seat 302 to permit entry of air beneath the ram head to release the vacuum. The pipe 109 (FIGS. 1, 20) will collect any liquid which gets through the valve. Water injection through pipe 109 can flush the valve and lubricate the pumping chamber.

I claim:

1. Apparatus for pumping animal waste from a livestock facility to a remote storage area comprising wall means defining a pumping chamber having an inlet and an outlet connected to a discharge pipe, an aperture in said pumping chamber wall means, wall means defining a hopper surrounding said inlet, a ram having wall means defining a ram head, valve means in said pumping chamber aperture affording communication of said pumping chamber with the atmosphere means for reciprocating said ram between an advanced position with said ram head in said pumping chamber and a retracted position with said ram free of said pumping chamber to allow waste to move into said pumping chamber beneath said ram and said valve means affording entry of air through said aperture into said pumping chamber between said ram and said discharge pipe to reduce vacuum during withdrawal of said ram to the retracted position to facilitate return of said ram to the retracted position, and said valve means closing said aperture during movement of said ram to said advanced position to prevent escape of pressure from said pumping chamber.

2. Apparatus for pumping animal waste from a livestock facility to a remote storage area comprising wall means defining a pumping chamber having an inlet and an outlet connected to a discharge pipe, wall means defining a hopper surrounding said inlet, a ram, means for reciprocating said ram between advanced and retracted positions through said hopper and said pumping chamber, and vacuum relief valve means on said pumping chamber to afford entry of air into said pumping chamber between said ram and said discharge pipe to reduce vacuum during withdrawal of said ram to facilitate return of said ram to the retracted position, and wherein said vacuum relief valve means includes an aperture in said pumping chamber wall means, a valve stem movable with respect to said aperture, a valve member on said valve stem adapted to seal said aperture and means for actuating said vacuum relief valve means to open said vacuum relief means during retraction of said ram.

3. Apparatus in accordance with claim 2 wherein said means for actuating said vacuum relief means comprises a hydraulic cylinder connected to said vacuum relief means stem and hydraulic circuit means to open said valve during withdrawal and retraction of said ram.

4. Apparatus for pumping animal waste from a livestock facility to a remote storage area comprising wall means defining a pumping chamber having an inlet and an outlet connected to a discharge pipe, wall means defining a hopper surrounding said inlet, a ram having wall means defining a ram head and a ram head aperture, valve means in said ram head aperture affording communication of said pumping chamber with the atmosphere, means for reciprocating said ram between an advanced position with said ram head in said pumping chamber and a retracted position with said ram free of said pumping chamber to allow waste to move into said pumping chamber beneath said ram and said valve means affording entry of air through said aperture into said pumping chamber between said ram and said discharge pipe to reduce vacuum during withdrawal of said ram to the retracted position to facilitate return of said ram to the retracted position, and said valve means closing said aperture during movement of said ram to said advanced position to prevent escape of pressure from said pumping chamber, and wherein said valve means includes a valve stem and a valve member and means to open said valve means comprising a hydraulic cylinder located inside said ram and connected to said valve stem.

5. Apparatus for pumping animal waste from a livestock facility to a remote storage area comprising wall means defining a pumping chamber having an inlet and an outlet connected to a discharge pipe, wall means defining a hopper surrounding said inlet, a ram having a ram head and an aperture in said ram head, means for reciprocating said ram between advanced and retracted positions through said hopper and said pumping chamber, and vacuum relief valve means on said ram head to afford entry of air into said pumping chamber between said ram and said discharge pipe to reduce vacuum during withdrawal of said ram to facilitate return of said ram to the retracted position, including a valve stem extending through said ram head aperture, a valve member connected to said valve stem and movable into and from a sealing position across said aperture and a drag on said valve stem engageable with the contents of said pumping chamber to cause movement of said valve stem to open said valve member upon withdrawal of said ram.

6. Apparatus for pumping animal waste from a livestock facility to a remote storage area comprising wall means defining a pumping chamber having an inlet and an outlet connected to a discharge pipe, wall means defining a hopper surrounding said inlet, a ram, means for reciprocating said ram between advanced and retracted positions through said hopper and said pumping chamber, and vacuum relief valve means on said pumping chamber to afford entry of air into said pumping chamber between said ram and said discharge pipe to reduce vacuum during withdrawal of said ram to facilitate return of said ram to the retracted position, including a water conduit connected to said valve means to provide a water discharge into said pumping chamber during retraction of said ram to overcome the vacuum in said pumping chamber and lubricate said pumping chamber and said discharge pipe and flush said valve means.

7. Apparatus for pumping animal waste from a livestock facility to a remote storage area comprising a pumping chamber having an upwardly open inlet, wall means defining a hopper located above and surrounding said inlet, a wall means defining a hollow ram operatively associated with the said pumping chamber, means for reciprocating said ram through said hopper and into and from said pumping chamber, vacuum relief valve means in said ram to relieve the vacuum in said pumping chamber beneath said ram during the upstroke of said ram, said valve means including a valve seat with a through aperture which communicates with said pumping chamber and with the atmosphere through the top of said ram, a flexible valve member which is normally closed against said valve seat to seal said aperture and said valve member being maintained closed by pressure of said ram on the pumping chamber contents during the working stroke of said ram and said valve member flexing away from said valve seat on said upstroke of said ram to open said aperture on the upstroke to cause entry of air in the said pumping chamber and including a pipe means connected to and extending upwardly from said valve means within said ram to collect any fluid seeping through said valve means and for flushing said valve means.

* * * * *

UNITED STATES PATENT AND TRADEMARK OFFICE
CERTIFICATE OF CORRECTION

PATENT NO. : 3,995,734
DATED : December 7, 1976
INVENTOR(S) : Vernon R. Berg, Jr.

It is certified that error appears in the above-identified patent and that said Letters Patent are hereby corrected as shown below:

Column 9, Line 15 following "vacuum relief" insert

--valve--

Column 9, Line 18 following "vacuum relief" insert

--valve--

Column 9, Line 20 following "relief" insert --valve--

Signed and Sealed this

Twenty-sixth Day of April 1977

[SEAL]

Attest:

RUTH C. MASON
Attesting Officer

C. MARSHALL DANN
Commissioner of Patents and Trademarks